US005120945A

United States Patent [19]

Nishibe et al.

[11] Patent Number: 5,120,945

[45] Date of Patent: Jun. 9, 1992

[54] TRANSACTION RECORDING SYSTEM AND METHOD

[75] Inventors: Kunihiko Nishibe, Tsuchiura; Yoshio Fukudome, Ibaraki; Masataka Kawauchi, Ishioka, all of Japan

[73] Assignee: Hitachi, Ltd., Tokyo, Japan

[21] Appl. No.: 564,616

[22] Filed: Aug. 9, 1990

[30] Foreign Application Priority Data

Aug. 31, 1989 [JP] Japan .................................. 1-225330

[51] Int. Cl.[5] .............................................. G06R 18/30

[52] U.S. Cl. .................................... 235/379; 235/380; 902/4

[58] Field of Search .................... 235/379, 380; 902/4; 364/408

[56] References Cited

U.S. PATENT DOCUMENTS 4,641,239 2/1987 Takesako ................................ 902/4

*Primary Examiner*—Harold Pitts

*Attorney, Agent, or Firm*—Antonelli, Terry Stout & Kraus

[57] ABSTRACT

A transaction recording system comprises means for inputting transaction data, means for storing said transaction data, means for writing the transaction data input from said inputting means into said storing means, means for reading out required transaction data from said storing means and outputting them, and means for changing account processing data of a memo item and its related items among the transaction data stored in said storing means. A transaction recording method comprises the steps corresponding to the respective means of the system. The transaction recording system and method permit the transaction data to be later changed thereby to provide data useful for processing an account such as a household account book.

13 Claims, 17 Drawing Sheets

CPU

TRANSACTION DATA STORAGE DEVICE

FIG. 1
PRIOR ART 18
20
27 x

ORDINARY DEPOSIT

| LINE | DATE | MEMO | PAYMENT | DEPOSIT | BALANCE |
|---|---|---|---|---|---|
| 1 | MAR.20,'89 | ATM | | 10,000 | 1,010,000 |
| 2 | MAR.25,'89 | SALARY | | 300,000 | 1,310,000 |
| 3 | APR. 1,'89 | ATM | 120,000 | | 1,190,000 |
| 4 | APR. 10,'89 | TRANSTER | | 100,000 | 1,290,000 |
| 5 | APR. 12,'89 | POWER | 7,000 | | 1,283,000 |
| 6 | APR. 12,'89 | GAS | 5,000 | | 1,278,000 |
| 7 | APR. 15,'89 | WATER | 4,000 | | 1,274,000 |
| 8 | APR. 16,'89 | LOAN | 50,000 | | 1,224,000 |
| 9 | APR. 16,'89 | SCHOOL | 10,000 | | 1,214,000 |
| 10 | APR. 20,'89 | ATM | | 5,000 | 1,214,900 |
| 11 | APR. 25,'89 | TELEPHONE | 10,000 | | 1,209,000 |
| 12 | APR. 26,'89 | ATM | 20,000 | | 1,189,000 |
| 13 | APR. 26,'89 | ATM | | 700 | 1,189,700 |
| 14 | APR. 26,'89 | SALARY | | 400,000 | 1,589,700 |
| 15 | APR. 27,'89 | ATM | 50,000 | | 1,539,700 |
| 16 | | | | | |

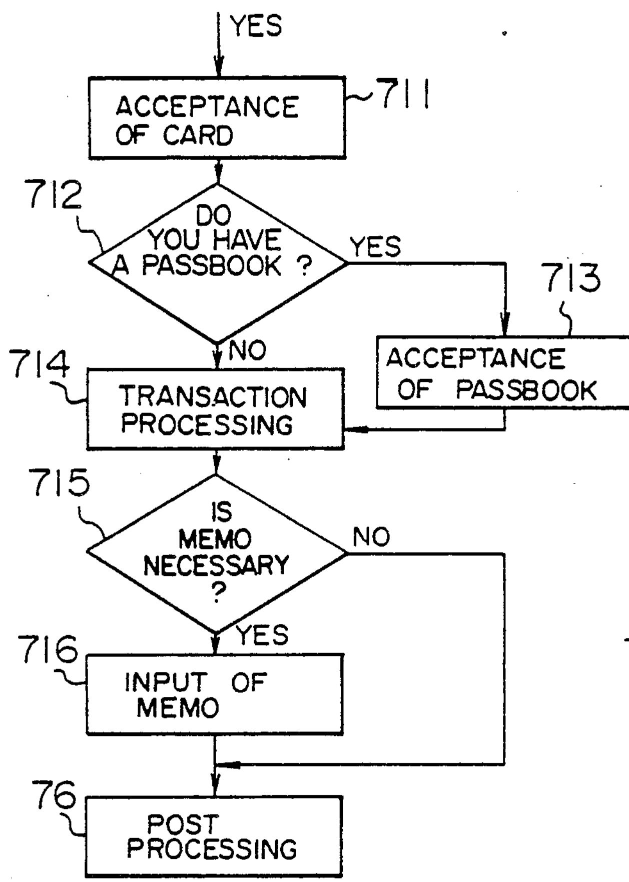

FIG. 7B
YES
ACCEPTANCE OF CARD
711
712
DO YOU HAVE A PASSBOOK ?
YES
713
ACCEPTANCE OF PASSBOOK
NO
714
TRANSACTION PROCESSING
715
IS MEMO NECESSARY ?
NO
YES
716
INPUT OF MEMO
76
POST PROCESSING

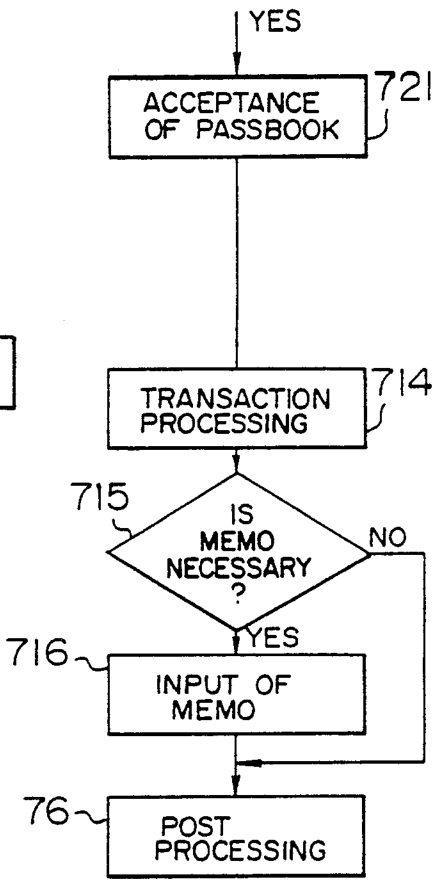

FIG. 7C
YES
ACCEPTANCE OF PASSBOOK
721
TRANSACTION PROCESSING
714
715
IS MEMO NECESSARY ?
NO
YES
716
INPUT OF MEMO
76
POST PROCESSING

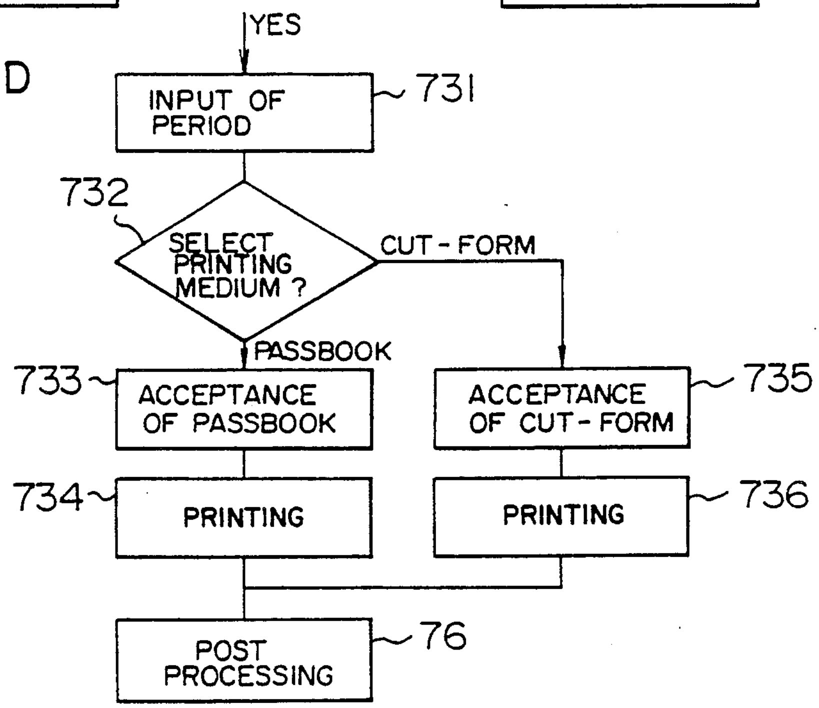

FIG. 7D
YES
INPUT OF PERIOD
731
732
SELECT PRINTING MEDIUM ?
CUT-FORM
PASSBOOK
733
ACCEPTANCE OF PASSBOOK
ACCEPTANCE OF CUT-FORM
735
734
PRINTING
PRINTING
736
POST PROCESSING
76

FIG. 9A

| DATA ITEM | DATA CONTENTS | REMAKS |
|---|---|---|
| SYSTEM FLAG | FLAG INDICATIVE OF VALIDITY OF CARD OR PASSBOOK | COMMON DATA AREA (90) |
| CODE NUMBER | REGISTERED CODE NUMBER | |
| BANK NUMBER | | |
| BRANCH NUMBER | | |
| DEPOSIT CLASS | | |
| ACCOUNT NUMBER | | |
| ACCOUNT NAME | | |
| CARD NUMBER | | |
| SEQUENCE No. 1<br>----<br>---- | | INDIVIDUAL TRANSACTION DATA AREA (91) |
| SEQUENCE No. i | ADDED FOR EACH TRANSACTION | INDIVIDUAL TRANS-ACTION DATA AREA (91) |
| PROCESSING DATE | (Apr. 1, '89) | |
| PROCESSING CONTENTS | DEPOSIT; 1, WITHDRAW; 2, PASSBOOK; 3, ETC. | |
| TRANSACTION CODE | ATM; 1, COUNTER; 2, ETC. | |
| PAGE AND LINE OF PASSBOOK | (x PAGE 3 LINE) | |
| TRANSACTION AMOUNT OF MONEY | ¥ ····· (¥ 120,000) | |
| MEMO 1 | (ATM) | |
| OTHER DATA AREA | | |
| RECORDED CONTENTS | TO WHERE HAVE DATA BEEN RECORDED? | |
| BALANCE 1 | ¥ ····· (¥ 1,190,000) | |
| SEQUENCE No. i+1 | | INDIVIDUAL TRANS-ACTION DATA AREA (91) |

FIG. 9B

| DATA ITEM | DATA CONTENT | REMARKS |
|---|---|---|
| SYSTEM FLAG<br>CODE NUMBER<br>BANK NUMBER<br>BRANCH NUMBER<br>DEPOSIT CLASS<br>ACCOUNT NUMBER<br>ACCOUNT NAME<br>CARD NUMBER | FLAG INDICATIVE OF VALIDITY OF CARD OR PASSBOOK<br>REGISTERED CODE NUMBER | COMMON DATA AREA |
| SEQUENCE No. 1<br>----<br>---- | | INDIVIDUAL TRANSACTION DATA AREA |
| SEQUENCE No. i<br>PROCESSING DATE<br>PROCESSING CONTENTS<br>TRANSACTION CODE<br>PAGE AND LINE OF PASSBOOK<br>TRANSACTION AMOUNT OF MONEY 1<br>MEMO 1<br>TRANSACTION AMOUNT OF MONEY 2<br>MEMO 2<br>TRANSACTION AMOUNT OF MONEY 3<br>MEMO 3<br>TRANSACTION AMOUNT OF MONEY 4<br>MEMO 4<br>OTHERE DATA AREA<br>RECORDED CONTENTS<br>BALANCE 1<br>BALANCE 2<br>BALANCE 3<br>BALANCE 4<br>BALANCE 5 | <br>Apr. 1, '89<br>WITHDRAW ; 2<br>ATM; 1<br>X PAGE 3~6 LINE<br>¥ 120,000<br>ATM<br>¥ 85,000<br>FOODS<br>¥ 10,000<br>BOOK<br>¥ 15,000<br>GOODS FOR CHILDREN<br>TO WHERE HAVE DATA BEEN RECORDED ?<br><br>¥ 1,190,000<br>¥ 1,225,000<br>¥ 1,215,000<br>¥ 1,200,000<br>¥ 1,190,000 | INDIVIDUAL TRANSACTION DATA AREA |
| SEQUENCE No. i+1 | | INDIVIDUAL TRANSACTION DATA AREA |

90
91
91
91

4
26
29
0 1 2 3 4 5
6 7 8 9 YEN
YEAR
MONTH
DATE
PAGE
LINE
DEPOSIT
WITH-DRAW
CODE
SALARY
FOODS
HOUSE LOAN
WATER·LIGHTING/FUEL
EDUCA-TION/CHILD-CARE
COMMU-NICATION TRANS-PORTA-TION
CUL-TURE AMUSE-MENT
HY-GIENE
CHANGE
OTHERS

ORDINARY DEPOSIT

| LINE | DATE | MEMO | PAYMENT | DEPOSIT | BALANCE |
|---|---|---|---|---|---|
| 1 | MAR. 20,'89 | INPUT (CASH) | | 10,000 | 1,010,000 |
| 2 | MAR. 25,'89 | SALARY | | 300,000 | 1,310,000 |
| 3 | APR. 1,'89 | FOODS | 85,000 | | 1,225,000 |
| 4 | | BOOK | 10,000 | | 1,215,000 |
| 5 | | GOODS FOR CHILDREN | 15,000 | | 1,200,000 |
| 6 | | OTHERS | 10,000 | | 1,190,000 |
| 7 | APR. 10,'89 | TRANSFER (FROM MOTHER) | | 100,000 | 1,290,000 |
| 8 | APR. 12,'89 | POWER | 7,000 | | 1,283,000 |
| 9 | APR. 12,'89 | GAS | 5,000 | | 1,278,000 |
| 10 | APR. 15,'89 | WATER | 4,000 | | 1,274,000 |
| 11 | APR. 16,'89 | LOAN (FINANCE CORPORATION) | 50,000 | | 1,224,000 |
| 12 | APR. 16,'89 | SCHOOL (ELDER BROTHER) | 6,000 | | 1,218,000 |
| 13 | | SCHOOL (YOUNGER BROTHER) | 4,000 | | 1,214,000 |
| 14 | APR. 20,'89 | INPUT (PAYMENT FROM) | | 5,000 | 1,219,000 |
| 15 | APR. 25,'89 | TELEPHONE | 7,000 | | 1,219,000 |
| 16 | | TELEPHONE CONSTRUCTION | 3,000 | | 1,209,000 |

| LINE | DATE | MEMO | PAYMENT | DEPOSIT | TOTAL |
|---|---|---|---|---|---|
| 1 | JAN. 10,'89 | ATM | | 5,000 | |
| 2 | FEB. 5,'89 | ATM | | 15,000 | |
| 3 | MAR. 20,'89 | ATM | | 10,000 | 30,000 |
| 4 | JAN. 25,'89 | SALARY | | 250,000 | |
| 5 | FEB. 25,'89 | SALARY | | 280,000 | |
| 6 | MAR. 25,'89 | SALARY | | 300,000 | |
| 7 | ⋮ | ⋮ | | | |
| 8 | DEC. 25,'89 | SALARY | | 310,000 | 3,600,000 |
| 9 | APR. 10,'89 | TRANSFER | | 100,000 | |
| 10 | APR. 20,'89 | TRANSFER | | 100,000 | 200,000 |
| 11 | FEB. 20,'89 | INTEREST | | 1,000 | |
| 12 | APR. 20,'89 | INTEREST | | 5,000 | 6,000 |
| 13 | | TOTAL OF INCOME | | | 3,836,000 |
| 14 | | | | | |
| 15 | | | | | |
| 16 | | | | | |

ORDINARY DEPOSIT (EXPENDITURE)

| LINE | DATE | MEMO | PAYMENT | DEPOSIT | TOTAL |
|---|---|---|---|---|---|
| 1 | JAN. 13,'89 | ATM | 10,000 | | |
| 2 | FEB. 8,'89 | ATM | 50,000 | | |
| 3 | : | : | : | | |
| 4 | DEC. 29,'89 | ATM | 30,000 | | 1,800,000 |
| 5 | JAN. 12,'89 | POWER | 7,000 | | |
| 6 | FEB. 11,'89 | POWER | 6,000 | | |
| 7 | : | : | : | | |
| 8 | DEC. 12,'89 | POWER | 8,000 | | 84,000 |
| 9 | JAN. 12,'89 | GAS | 5,000 | | |
| 10 | : | : | : | | |
| 11 | DEC. 12,'89 | GAS | 6,000 | | 72,000 |
| 12 | JAN. 15,'89 | WATER | 5,000 | | |
| 13 | : | : | : | | |
| 14 | DEC. 15,'89 | WATER | 4,000 | | 60,000 |
| 15 | : | : | : | | : |
| 16 | | TOTAL OF EXPENDITURE | | | 3,300,000 |

INCOME / EXPENDITURE TOTAL TABLE (APRIL, '89) PAGE 1

| DATE | MEMO | AMOUNT OF MONEY | TOTAL |
|---|---|---|---|
| INCOME | | | |
| APR. 10, '89 | TRANSFER (FROM MOTHER) | 100,000 | |
| APR. 26, '89 | SALARY | 400,000 | |
| APR. 20, '89 | INPUT (PAYMENT FROM SCHOOL) | 5,000 | |
| APR. 26, '89 | INPUT (CHANGE) | 700 | |
| | TOTAL OF INCOME | | 505,700 |

35

34

PAGE 2

| DATE | MEMO | AMOUNT OF MONEY | TOTAL |
|---|---|---|---|
| EXPENDITURE | | | |
| APR. 1, '89 | FOODS | 85,000 | |
| | BOOKS | 10,000 | |
| | CHILDREN GOODS | 15,000 | |
| | OTHERS | 10,000 | |
| APR. 12, '89 | POWER | 7,000 | |
| APR. 12, '89 | GAS | 5,000 | |
| APR. 15, '89 | WATER | 4,000 | |
| APR. 16, '89 | LOAN (FINANCE CORPORATION) | 50,000 | |
| APR. 16, '89 | SCHOOL (ELDER BROTHER) | 6,000 | |
| | SCHOOL (YOUNGER BROTHER) | 4,000 | |

35

34

PAGE 3

| DATE | MEMO | AMOUNT OF MONEY | TOTAL |
|---|---|---|---|
| APR. 25, '89 | TELEPHONE | 7,000 | |
| | TELEPHONE CONSTRUCTION | 3,000 | |
| | TOTAL OF EXPENDITURE | | 276,000 |
| | DIFFERENCE | | 229,700 |
| APR. 30, '89 | BALANCE | | 15,539,700 |

INCOME / EXPENDITURE YEAR TOTAL TABLE ( A.D. YEAR)

| ITEM \ MONTH | | 1 | 2 | 3 | 4 | 5 | 6 | 7 | 8 | 9 | 10 | 11 | 12 | TOTAL |
|---|---|---|---|---|---|---|---|---|---|---|---|---|---|---|
| INCOME | SALARY | | | | | | | | | | | | | |
| | INPUT OF MONEY | | | | | | | | | | | | | |
| | OTHERS | | | | | | | | | | | | | |
| | | | | | | | | | | | | | | |
| | TOTAL OF INCOME | | | | | | | | | | | | | |
| EXPENDITURE | FOODS | | | | | | | | | | | | | |
| | HOUSE LOAN | | | | | | | | | | | | | |
| | WATER, LIGHTING AND FUEL | | | | | | | | | | | | | |
| | EDUCATION, CHILDREN CARE | | | | | | | | | | | | | |
| | COMMUNICATION, TRANSPORTATION | | | | | | | | | | | | | |
| | CULTURE, AMUSEMENT | | | | | | | | | | | | | |
| | HYGIENE | | | | | | | | | | | | | |
| | OTHERS | | | | | | | | | | | | | |
| | | | | | | | | | | | | | | |
| | TOTAL OF EXPENDITURE | | | | | | | | | | | | | |
| | | | | | | | | | | | | | | |
| DIFFERENCE | | | | | | | | | | | | | | |
| BALANCE | | | | | | | | | | | | | | |

TOTAL TABLE (A.D. YEAR)

| | ITEM / MONTH | 1 | 2 | 3 | 4 | 5 | 6 | 7 | 8 | 9 | 10 | 11 | 12 | |
|---|---|---|---|---|---|---|---|---|---|---|---|---|---|---|
| INCOME | A STORE | | | | | | | | | | | | | |
| | B STORE | | | | | | | | | | | | | |
| | C STORE | | | | | | | | | | | | | |
| | D COMPANY | | | | | | | | | | | | | |
| | E COMPANY | | | | | | | | | | | | | |
| | F COMPANY | | | | | | | | | | | | | |
| | INTEREST | | | | | | | | | | | | | |
| EXPENDITURE | A STORE | | | | | | | | | | | | | |
| | B STORE | | | | | | | | | | | | | |
| | C STORE | | | | | | | | | | | | | |
| | D COMPANY | | | | | | | | | | | | | |
| | E COMPANY | | | | | | | | | | | | | |
| | F COMPANY | | | | | | | | | | | | | |
| | | | | | | | | | | | | | | |
| | | | | | | | | | | | | | | |
| | | | | | | | | | | | | | | |
| DIFFERENCE | | | | | | | | | | | | | | |
| BALANCE | | | | | | | | | | | | | | |

ORDINARY DEPOSIT

| LINE | DATE | MEMO | PAYMENT | DEPOSIT | BALANCE |
|---|---|---|---|---|---|
| 1 | JAN. 20,'89 | TRANSFER (A STORE) | | 30,000 | 500,000 |
| 2 | JAN. 20,'89 | TRANSFER (B STORE) | | 24,000 | 520,000 |
| 3 | JAN. 22,'89 | TRANSFER (C STORE) | 100,000 | | 420,000 |
| 4 | JAN. 23,'89 | TRANSFER (A STORE) | 20,000 | | 410,000 |
| 5 | JAN. 26,'89 | TRANSFER (D COMPANY) | | 50,000 | 450,000 |
| 6 | FEB. 1,'89 | TRANSFER (E COMPANY) | | 200,000 | 650,000 |
| 7 | FEB. 5,'89 | TRANSFER (A STORE) | 152,000 | | 500,000 |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |

TRANSACTION RECORDING SYSTEM AND METHOD

BACKGROUND OF THE INVENTION

The present invention relates to a transaction recording system and method, and more particularly to a system and method for changing the contents of a cash transaction.

Automated transaction machines such as an automated teller machine, which have spread remarkably in recent years, have a large number of functions such as automatic transfer of several kinds of public money as well as cash deposit and withdrawal. With the spread of these automated transaction machines, the transaction frequency of users has increased gradually. With these machines, generally, the contents of the transaction are printed or typed in the order of transactions on a passbook issued from the users' own financial institute.

FIG. 1 shows an conventional example of a record of the transactions typed on a passbook 18. A bar code 27, indicative of the page of intermediate papers of the passbook 18, can be generally recognized by a bar code reader provided in a pass book processing unit. As seen from FIG. 1, the record of the passbook includes several transaction data such as cash deposit and withdrawal using an automated teller machine (ATM), automatic transfer of a salary, and automatic payment of the gas, power, water or similar bills, which are typed in the order of time as are their memo.

The item of 'ATM' in the memo column on the passbook 18 represents a cash deposit or a withdrawal using the automated teller machine. For example, the item of ATM as an expenditure does not suggest the use for cash payment unlike the other terms, e.g. power, gas, etc. So the user may forget the use for the payment in question in keeping her household account book later. This also applies to the term of 'transfer'.

In order to overcome such a defect, JP-A-60-8977 proposes a cash transaction recording system which permits a user to type transaction processing data of cash deposit or withdrawal together with their memo on a passbook, a specification card, or the like in using an ATM. Also, JP-A-63-261464 discloses a system which permits the memos to be typed according to their item so that the household account book can be easily kept later. This system permit accounts such as keeping a household account book to be efficiently done in such a manner that the typing format of the passbook is regulated in several ways.

However, the systems mentioned above have the following defects. The system disclosed in JP-A-60-8977 permits individual items in the memo to be optionally described only when the ATM is used. The use of money will often be different from its planned use, the memo item, thus, will be required to be rewritten later. Further, it is rare that the amount of money as much as 120,000 yen, which is paid as indicated in the third row in the passbook as shown in FIG. 1, is used for only one use. This also requires the system to be improved.

SUMMARY OF THE INVENTION

An object of the present invention is to provide a transaction system which can rewrite the memo item indicative of the contents of a transaction at any time.

Another object of the present invention is to provide a transaction system which gives a new memo to each of the portions into which a memo item is divided so that accounts can be easily made.

Still another object of the present invention is to provide a transaction system which can output memos arranged according to the same or the same kind of item so that accounts can be easily made.

In order to attain the above objects, in accordance with the present invention, there is provided a transaction recording system comprising means for inputting transaction data, means for storing said transaction data, means for writing the transaction data input from inputting means into storing means, means for reading out required transaction data from storing means and outputting them, and means for changing account processing data of a memo item and its related items among the transaction data stored in said storing means.

Further, in order to output the memos arranged according to the same or the same kind of item, there is provided means for classifying the read transaction data according to the memo items and outputting the memo item of the classified data and their related memo item through said output means.

BRIEF DESCRIPTION OF THE DRAWINGS

FIG. 1 is a plan view of the passbook having a record typed according to the prior art transaction recording system;

FIGS. 7A to 7D are flowcharts showing the operation of the ATM;

FIGS. 9A and 9B are views showing areas for storing data related to transactions in a transaction storing device;

FIGS. 12 to 14 are views showing examples of a record of a passbook on which transaction data are typed so that they can be used for a household account book;

FIGS. 15 to 17 are view showing examples of a record on a cut form on which transaction data are typed so that they can be used for a household account book; and FIG. 18 is a view showing a record for using a passbook as that exclusively used for customers.

DESCRIPTION OF THE PREFERRED EMBODIMENTS

Figure 2:
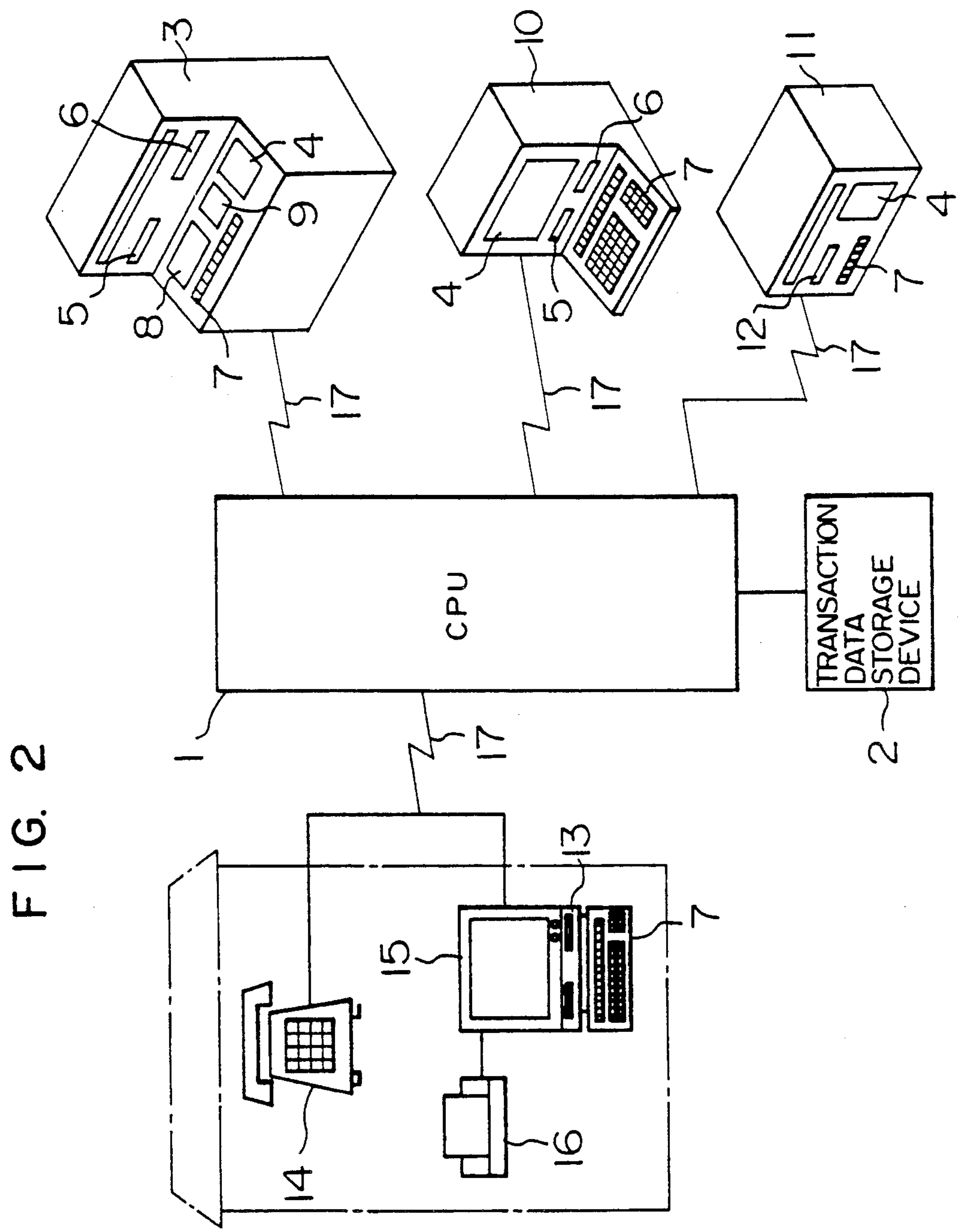
FIG. 2 is a view showing an arrangement of the transaction recording system according to one embodiment of the present invention.

FIG. 2 shows a transaction recording system according to one embodiment of the present invention. The transaction recording system mainly comprises a central processing unit (CPU) 1, a transaction data storing device 2, an automated teller machine (ATM) 3, a transaction data input device 10 and a transaction data output device 11; the devices 3, 10 and 11 are connected with the CPU 1 through a communication line 17, respectively, and the devices 10 and 11 may be provided integral to or separate from the ATM 3. The ATM 3 comprises a guidance panel 4 such as a CRT (cathode ray tube), a passbook processing unit 5, a card processing unit 6, an operation button 7 for a user, a bill processing unit 8 and a coin processing unit 9. The transaction data input device 10 comprises the guidance panel 4, the passbook processing unit 5 and the card processing unit 6. The transaction data output device 11 comprises a printing medium input/output unit 12 in addition to the guidance panel 4 and the operation button 7. A transaction data input/output data device 13 such as a personal computer of a customer using a finance program can be located in a store or a general home and is connected with the CPU 1 through the communication line 17; the transaction data input/output device 13 comprises a display device 15 such as a CRT, the operation button 7, and also connected with a transaction data output device 16. A line connection device 14 such as a telephone is also connected with the CPU 1. In this system, transactions initially recorded so that transaction data may be changed as required such as by being random-accessed to past transaction data.

Figure 3:
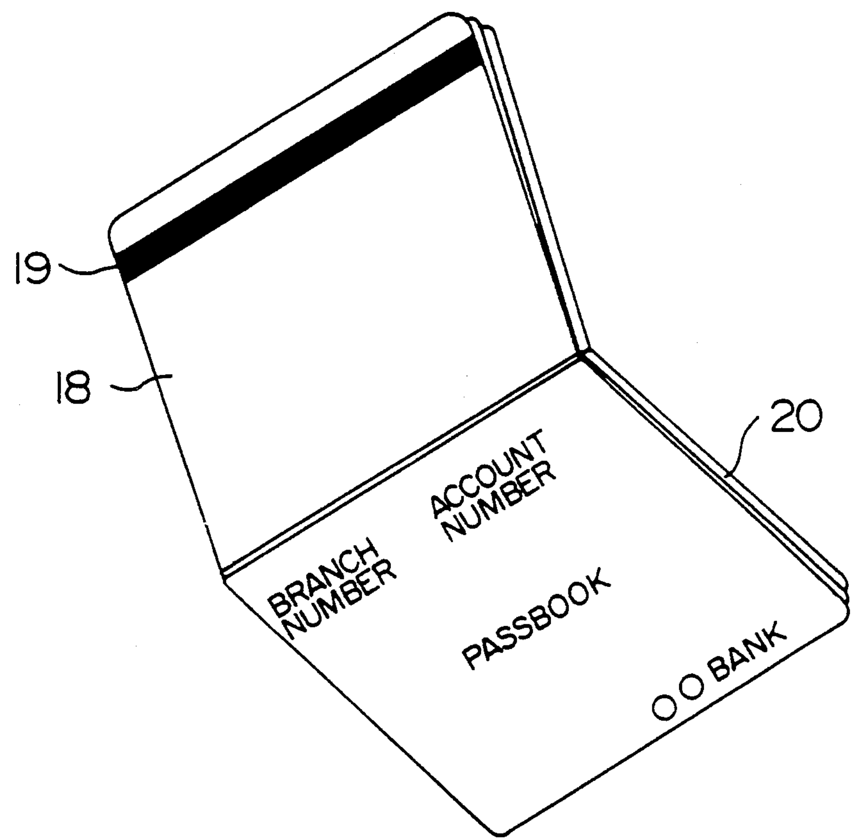
FIG. 3 is a perspective view of a passbook.

FIG. 3 shows a passbook 18 including intermediate sheets of paper 20 and a magnetic stripe 19 on which the number of a user's account number is described. This passbook 18 is dealt with by the passbook processing unit 5.

Figure 4:
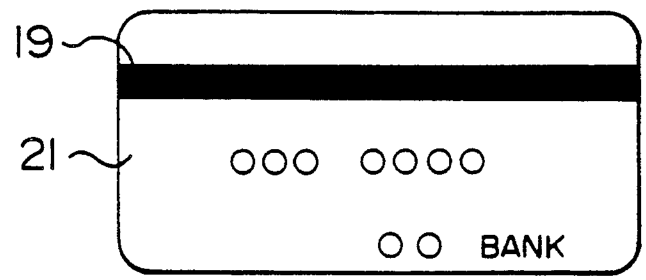
FIG. 4 is a plan view of a magnetic card.

FIG. 4 shows a magnetic card 21 including the magnetic stripe 19. This magnetic card 21 is dealt with by the card processing unit 6.

Figure 5:
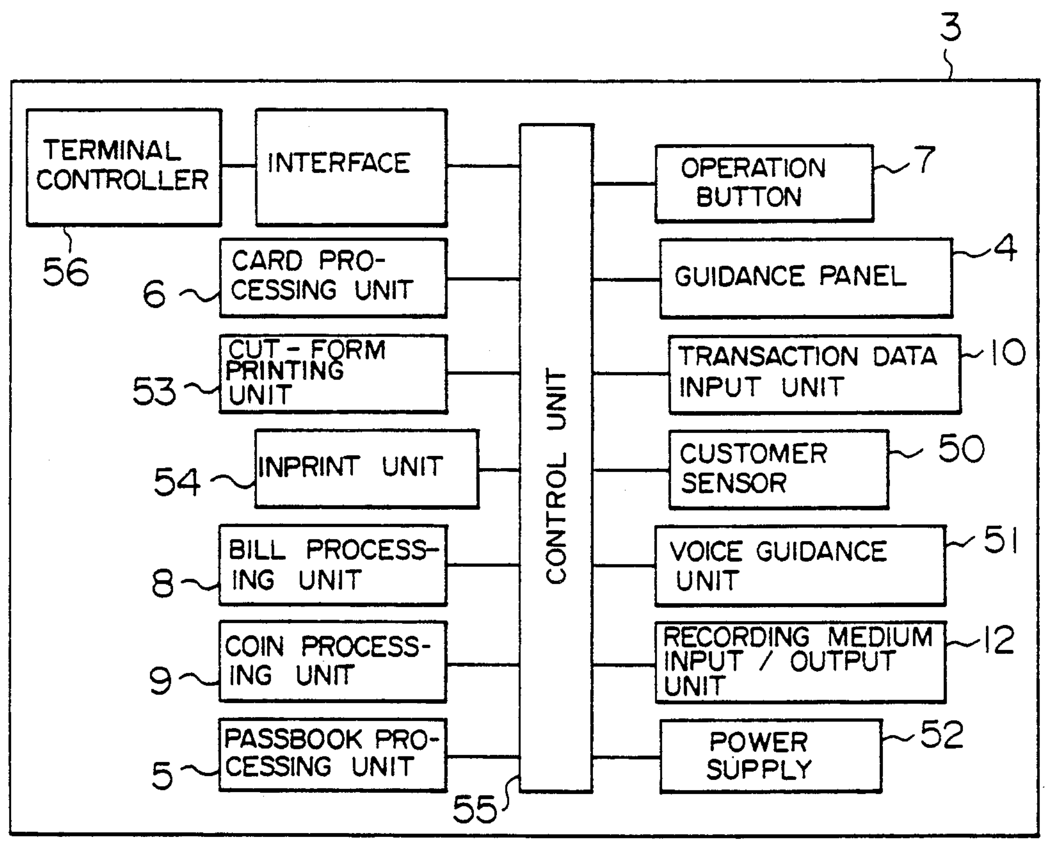
FIG. 5 is a block diagram of an automated teller machine (ATM)

FIG. 5 shows the detailed arrangement of the ATM 3. In FIG. 2, like reference numerals designate like parts in FIG. 5. In addition to the components shown in FIG. 2, the ATM 3 comprises a user sensor 50, a voice guidance unit 51, a power supply 52, a cut-form printing unit 53, an input unit 54 and a control unit 55, which are well known in their mechanism.

Figure 6:
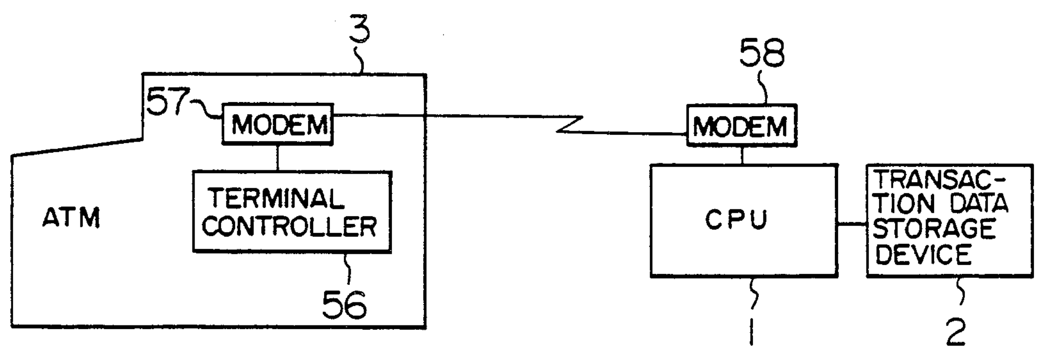
FIG. 6 is a block diagram of the manner of connection between the ATM and a central processing unit (CPU)
Figure 7A:
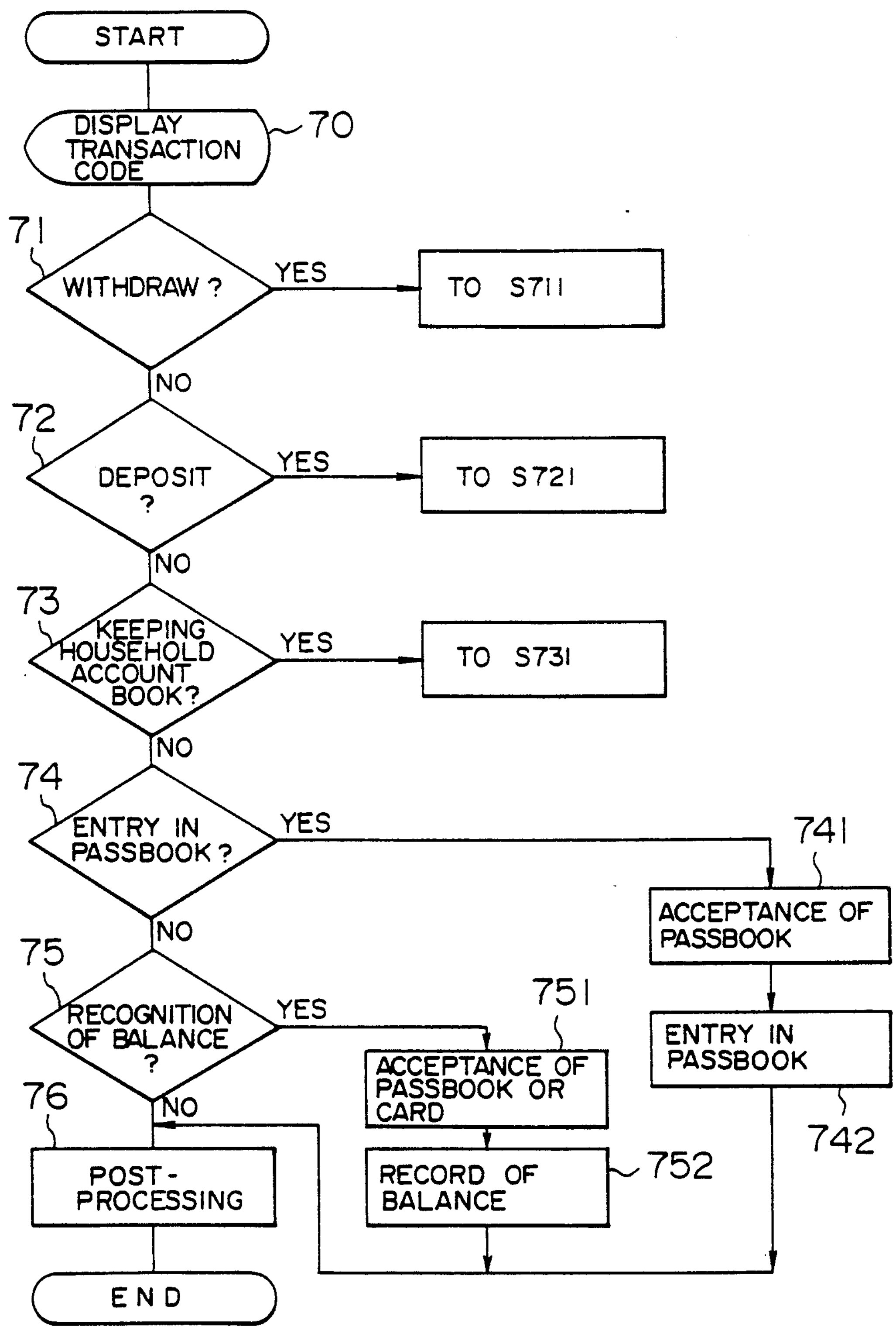

FIG. 6 shows that the ATM 3 also comprises a terminal controller 56 which is connected with the CPU 1 through modems 57 and 58. The data communicated between the ATM 3 and CPU 1 in a well known way include common transaction data (a code number, an account number, a card number, etc.) and data peculiar to a transaction in question (a transaction amount of money, a balance data, a memo, etc.).

Now referring to FIGS. 7A to 7D, the operation of the ATM 3 will be explained below.

When the user sensor 50 senses that a user stands in front of the ATM 3, the operation of the ATM 3 is initiated. First, choices of transaction codes are displayed on the guidance panel 4 (S70).

If the user selects the choice of withdrawal (S71), the operation proceeds to the flow as shown in FIG. 7B. In this flow, a card and/or a passbook are accepted (S711 to S713); a transaction processing is executed (S714); further if required, a memo related to the transaction is input; and finally a post-processing is executed (S76). In the post-processing (S76), the data related to the transaction in question are sent from the ATM 3 to the CPU 1 and then stored in the memory device 2.

If the user selects the choice of deposit (S72), the operation proceeds to the flow as shown in FIG. 7C. In this flow, the passbook is first accepted (S721), and thereafter the same processings as shown in FIG. 7B are executed. Likewise, it should be noted that in this specification, like reference numerals designate like steps or like components in order to obviate repeated explanation.

If the user selects the choice of keeping a household account book (S73), the operation proceeds to the flow as shown in FIG. 7D which will be described later. If the user selects the choice of entry in a passbook or a balance recognition, known processings (S741, S742 and S76, or S751, S752 and S76) will be performed.

Explanation will be given for the processing of changing the memo indicative of a transaction and its related item after the processings as shown in FIGS. 7A to 7D have been executed.

Figure 8:
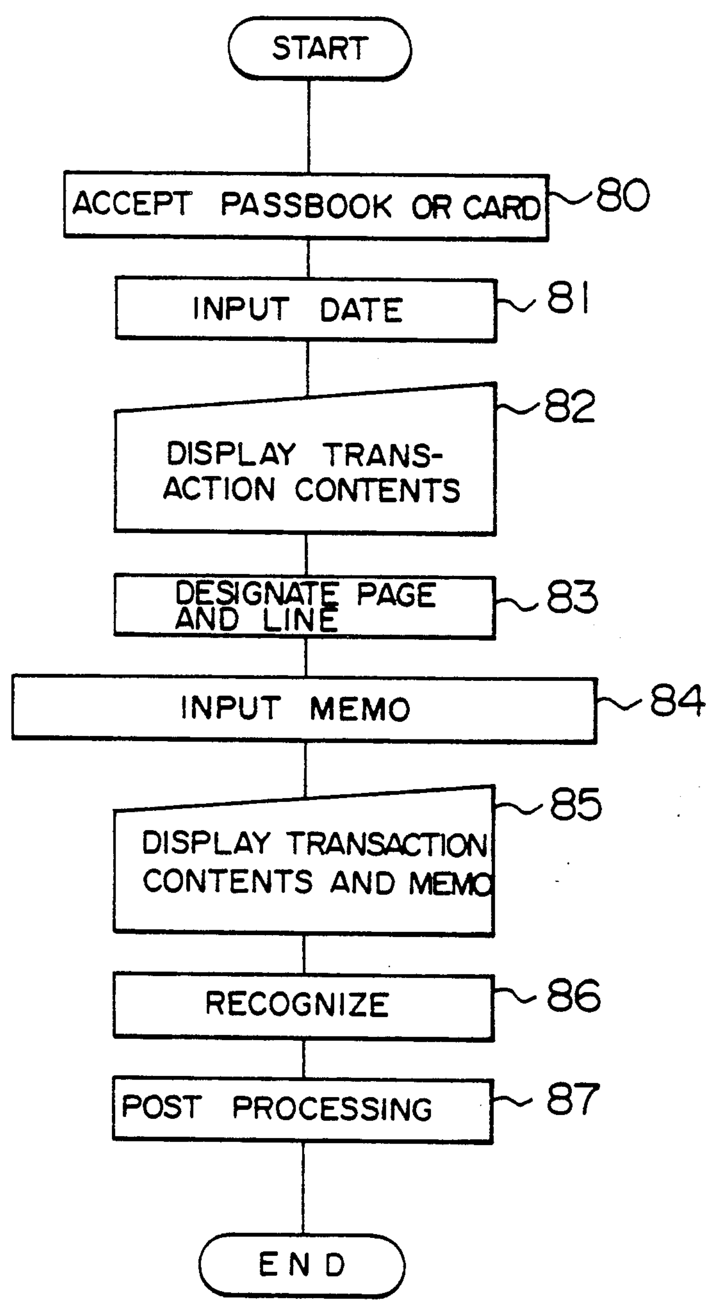
FIG. 8 is a flow chart showing the operation of a transaction inputting device.

FIG. 8 shows the procedure of changing a memo in the form of a flowchart. If the date of a transaction in question (S81) after a passbook or a card has been accepted (S80), the transaction contents on that day are displayed by means of the memory device 2 (S82). In order to select the item of the memo of which is desired to be changed, a cursor is moved to that item or the page and/or the line of thereof are designated (S83). A new memo is input (S84) and the memo as well as the transaction contents are displayed (S85). After this display is confirmed (S86), the post-processings such as printing the changed memo and return of the passbook (card) are performed (S87).

Further, the post-processing changes the contents of transaction data areas in the memory device 2 as explained below.

FIG. 9A shows an example of the transaction data areas in the memory device 2. In FIG. 9A, a common data area 90 stores the data peculiar to a specific user. Each of individual transaction data areas 91, which stores the data related to an individual transaction, is newly established in the order of the transaction.

The individual transaction data area corresponding to the transaction indicated in the third line from top of the passbook as shown in FIG. 1 stores the sequence No. i added for each transaction, the processing data of Apr. 1, 1989, processing contents, of the withdrawal, being output by ATM 3, the page and the line of a passbook of the x-th page and the third line, the transaction amount of money of 120,000 and the memo of ATM; these data are printed or typed as shown in the parenthesis. Incidentally, the contents of the memo are classified and symbolized. Amounts of money, and memos and balance forming pairs with the amounts of money may be described up to their maximum number of e.g. five in one individual transaction data area. If the number exceeds five, additional individual transaction data areas are also used.

After the post-processing (S87), the transaction data area 91 of the sequence No. i is changed as shown in FIG. 9B. In FIG. 9B, the transaction amount of money 1, memo 1 and balance 1 which have been stored are flagged so as not to be printed. The remaining data area stores a difference between the amount of money 1 and the amounts of money 2 to 4 which is calculated automatically by using well-known method. If the transaction amount of money 1 is smaller than the amounts of money 2 to 4 newly added, the character of the error will be displayed in step 85 in FIG. 8. Then, the total transaction of amount of money is not changed to assure the user's security. Further, the the page and lines of the individual transation data areas following to the data area in question are renewed.

In order to add new data for change as described above, the transaction data input device 10 as shown in FIG. 2 is used.

Figures 10, 11:
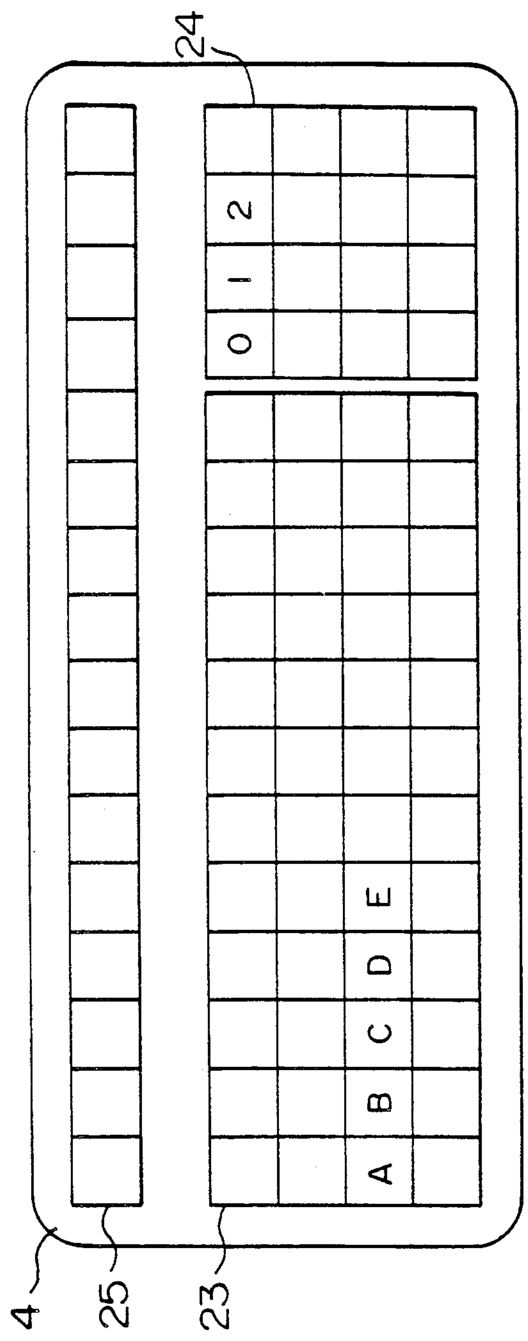
FIGS. 10 and 11 are views showing examples of the display on the guidance panel in a transaction data input device.

FIG. 10 shows an example of display on the guidance panel 4 of the above input device 10. The guidance panel 4, which is constructed in a touch panel operation system, comprises a series of characters 23, and a series of particular characters 24, which can be used as keys as illustrated. The guidance panel 4 comprises also a display part 25.

FIG. 11 shows a modification of FIG. 10. The guidance panel 4 shown in FIG. 11 comprises keys 26 consisting of ten keys, a yen key and a particular item key and general item keys 29. These keys may be pressed by either the touch panel system or the system using the operation button 7.

Incidentally, of course, the transaction data input device 10 can be provided integrally to the ATM 3. Further, the data change may be input from the transaction data input/output device 13 as shown in FIG. 2.

FIG. 12 shows a record obtained by printing the transaction data changed as described above on another page y of the passbook. As seen from FIG. 12, the memo of 'from mother' is added in the seventh line. This also can be executed by inputting a new memo in an individual transaction data area 91 of the memory device 2 in the manner as described above. The record as shown in FIG. 12 permits the passbook 18 to be additionally used as a household account book.

In order to print the new data on the passbook as shown in FIG. 12, the transaction data output device 11, the transaction input/output device 13 or the ATM 3 is used. Now referring to FIG. 7D, an explanation will be given for the operation in the case where the choice of keeping a household account book in the ATM 3 is selected by a user (S73 in FIG. 7A).

First, the period of keeping a user's household account book is inputted (S731). A printing medium is selected (S732). Since the printing medium is a passbook in the case of FIG. 12, the operation proceeds to step 733. When the ATM 3 accepts the passbook (S733), the data stored in the common data area 90 in FIG. 9A are collated with those on the passbook 18 by the CPU 1. If they agree, the transaction data are read on the basis of the period previously input and printed in order of data (starting from a smaller sequence number).

Figure 13:
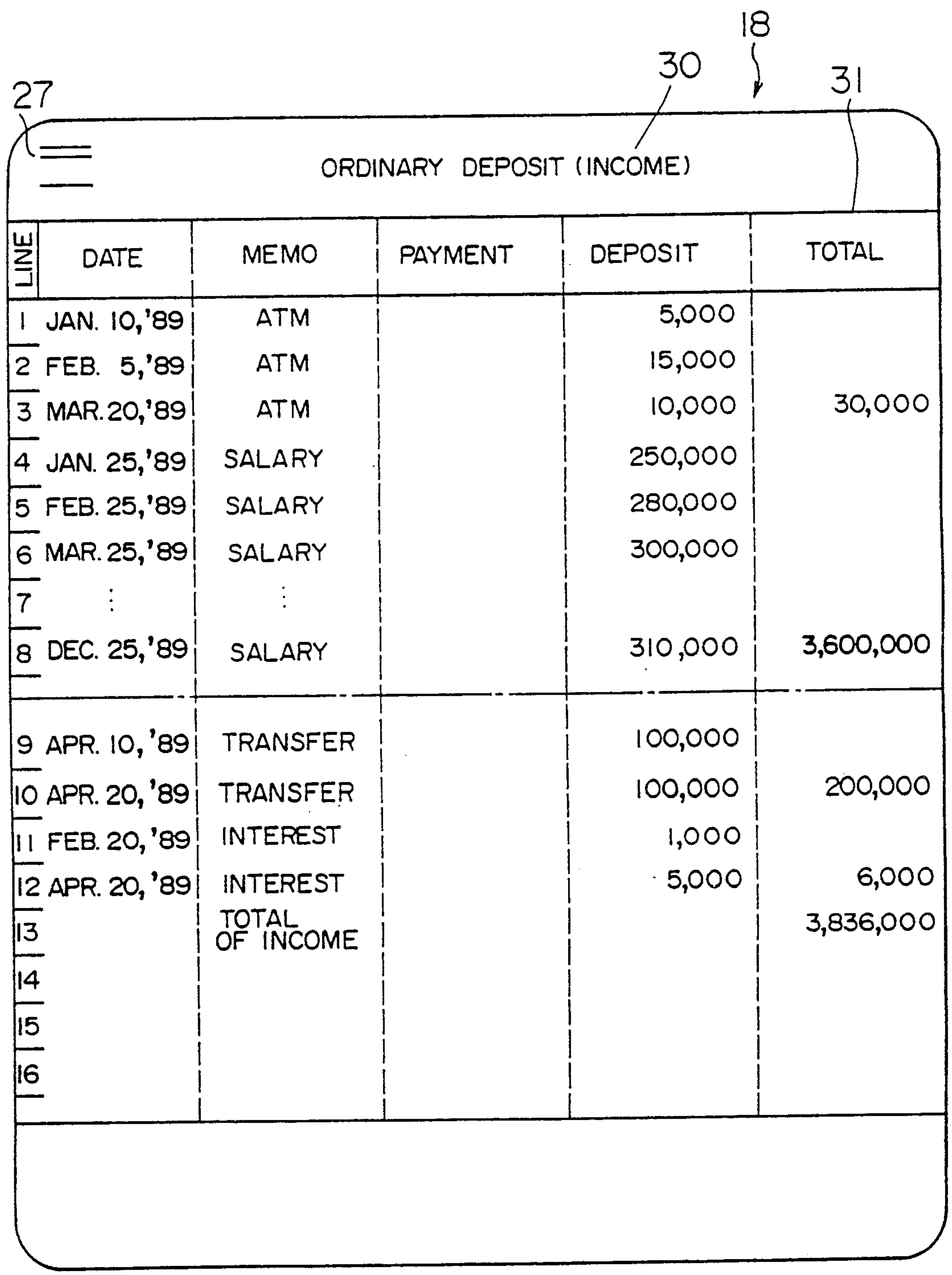

FIGS. 13 and 14 show the other records printed out on the passbook 18. More specifically, FIGS. 13 and 14 show records of transactions during a certain period printed out on the passbook 18. Whereas the transactions are printed out in time sequence in the case of FIG. 12, in the case of FIG. 13, the transactions belonging to income during one year of 1989 are classified according to their items and correctively arranged for each of the items. In order to clarify that these transactions belong to income, by means of a printing mechanism (not shown) an indication of (income) 30 is additively typed, and also the column of balance is erased by a double line to type an indication of total 31. The record of FIG. 13 includes lines 1 to 3 indicative of deposit amounts of money and their total amount of money the ATM, lines 4 to 8 indicative of automatic transfers of salary, lines 9 to 10 indicative of deposits by a transfer, lines 11 to 12 indicative of settled interests, and line 13 indicative of the total income amount of money during this year.

FIG. 14 shows a record of the transactions belonging to expenditure during one year of 1989 classified according to their items and correctively arranged for each of the items. In order to clarify that these transactions belong to a expenditure, by means of a printing mechanism (not shown) an indication of (expenditure) 32 is additively typed, and also the column of the balance is erased by a double line to type an indication of total 33. The record of FIG. 14 includes lines 1 to 4 indicative of withdrawal amounts of money and their total amount of money by the ATM, lines 5 to 8 indicative of automatic payments of the power, lines 9 to 11 indicative of that of the gas, lines 12 to 14 indicative of that of the water, and line 16 indicative of the total expenditure of money during this year.

FIG. 15 shows a record printed on cut-forms 34 by the transaction data output device 11 when a cut-form is selected in step 732 in FIG. 7D. Although in FIG. 15, the record is made on a sheet of paper of the cut-forms 34 continued through perforations, it may be made on a continuous sheet of paper with no perforation or on each of cut-forms separated.

The record of FIG. 15 is made about the period during one month of April, 1989, and it includes an income part, an expenditure part and a difference therebetween and a balance at the end of April. The items of transactions as shown in FIG. 12 during this period are classified into income and expenditure and their total amount of money calculated is also recorded.

FIG. 16 shows the recording format of another cut-form 36. The record is made on a sheet of paper in the form of a household account book on which characters indicative of required items classified according to income and expenditure are previously typed and entry columns are provided for each of the months. Such a recording format is particularly efficient for the case where a new transaction item is added.

FIG. 17 shows the recording format of still another cut-form 37 into which transactions described on a customer-dedicated passbook for recording payments for and transfers from customers as shown in FIG. 18 are to be posted. Specifically, the record is made on a sheet of paper on which characters of payment/transfer year total table are previously typed, and the, calculation results of total income by payments and the total expenditure by transfers are to be recorded for each of the customers. Such a recording format is efficient for examining the income/expenditure for each customer.

Incidentally, it should be understood from the above description that the expression of 'cut-form' in FIG. 7D means to include both formats of a customer list and a household account book.

In the system as shown in FIG. 2, the transaction data regarding a certain store or home as described above can be input/output through the transaction input/output device 13 such as a personal computer. Inputting-/outputting the data, first, the data input/output device 13 is line-connected with the CPU 1 in a finance constitute using telephone 14. Thereafter, the operation button 7, the display device 15 and the transaction data output device 16 are operated to add memos to the transaction data, and extract or output the transaction data in time sequence, according to transaction items and/or in the form of a household account book. The output transaction data may be stored in a transaction data storage device such as a disk (not shown) in the transaction data input/output device 13.

In this way, the embodiments of FIGS. 12 to 17 have described the records obtained by the process of automatically recording the transaction data during a certain period such as one year or one month in the form of a household account book in accordance with the flow of FIG. 7D. Since a user can optionally designate the above period in making the record, the household account book can also be formed for the period of e.g. half a year or three months Further, although the record has been made on the printing medium of a passbook (FIGS. 12 to 14) or cut-form(s) on which a form corresponding to transaction items are previously typed (FIGS. 15 to 17), this printing medium may be automatically selected according to the recording period, or may be prepared and set by the user.

Furthermore, the old record on a passbook may be erased to make the record as shown in FIGS. 12 to 14 in place of it (see JP-A-62-56167).

Further, the transaction recording system according to the present invention permits a user who does not require the record according the transaction item to designate the record in time sequence in a usual manner and thus can sufficiently satisfy the user.

Further, the user can use an IC card or a photo-card which stores transaction data instead of the magnetic card 21 shown in FIG. 4. The flowchart of depositing by using passbook is shown in FIG. 7C. When a transaction is operated by using the magnetic card with no passbook, the transaction data e.g., the memos and the transaction amount of money are printed on the passbook after the transaction operation.

Further, this invention can be applied to the payment-only CD machine and the transfer-only machine, etc. as it is applied to the ATM.

We claim:

1. A transaction recording system for recording transaction data of a transaction onto a recording medium comprising:

means for inputting said transaction data obtained during said transaction into a transaction device;

means for storing said transaction data including first memo data indicative of said transaction into a first transaction area of said recording medium;

means for reading said transaction data including said first memo data from said first transaction area and outputting said transaction data and said first memo data;

means for generating second memo data indicative of said outputted first memo data; and second data storing means for storing said second memo data in said first transaction area.

2. A transaction recording system according to claim 1, wherein said second memo data includes user data inputted by a user after said transaction.

3. A transaction recording system according to claim 2, wherein said second data storing means includes means for generating and storing third memo data indicative of a portion of said user data into a second transaction area of said recording medium.

4. A transaction recording system according to claim 1, wherein said transaction data further includes a transaction sum of money, a balance of money and a date of the transaction.

5. A transaction recording system according to claim 1, wherein said outputting means outputs said transaction data in an order corresponding to an input order of said transaction data.

6. A transaction recording system according to claim 1, wherein said outputting means outputs the transaction data in accordance with a classification of said transaction data.

7. A transaction recording system according to claim 6, wherein said classification includes income data and expenditure data, said income data being printed on a different portion of a printing medium than said expenditure data.

8. A transaction recording system according to claim 7, wherein said printing medium is a passbook.

9. A transaction recording system according to claim 7, wherein said outputting means includes means for erasing an old recording previously printed on said printing medium at an erased area of said printing medium and prints said transaction data at the erased area on the printing medium.

10. A transaction recording system according to claim 5, wherein said outputting means further includes means for printing the transaction data on a cut-form in accordance with the classification of the transaction data.

11. A transaction recording method for recording transaction data of a transaction onto a recording medium comprising the steps of:

inputting said transaction data obtained during said transaction into a transaction device;

storing said transaction data including first memo data in a transaction area disposed on said recording medium;

reading the transaction data including said first memo data from said transaction area and outputting said transaction data and said first memo data;

generating second memo data indicative of said first memo data; and storing said second memo data in said transaction area.

12. A transaction recording method according to claim 11, wherein said method further includes the step of inputting user data by a user after the transaction.

13. A transaction recording method according to claim 12, wherein said outputting step further includes the step of outputting the transaction data in an order corresponding to an input order of the transaction data.

* * * * *